United States Patent [19]

Decker, deceased et al.

[11] 4,186,559
[45] Feb. 5, 1980

[54] HEAT PIPE-TURBINE

[76] Inventors: Bert J. Decker, deceased, late of Buffalo, N.Y.; by Jean S. Decker, executrix, 136 Copen Blvd., Buffalo, N.Y. 14226

[21] Appl. No.: 693,195

[22] Filed: Jun. 7, 1976

[51] Int. Cl.² ............................................. F01K 27/00
[52] U.S. Cl. ...................................... 60/531; 60/670; 60/671; 165/105
[58] Field of Search ................. 60/531, 651, 670, 671; 165/105

[56] References Cited

U.S. PATENT DOCUMENTS

| | | | |
|---|---|---|---|
| 2,707,863 | 5/1955 | Rhodes | 60/669 |
| 3,312,065 | 4/1967 | Guin | 60/669 |
| 3,602,429 | 8/1971 | Levedahl | 165/105 |
| 3,670,495 | 6/1972 | Leffert | 60/531 |
| 3,932,995 | 1/1976 | Pecar | 60/531 |
| 4,069,673 | 1/1978 | Lapeyre | 60/669 |

FOREIGN PATENT DOCUMENTS 2408434  2/1974  Fed. Rep. of Germany ............. 60/670

Primary Examiner—Allen M. Ostrager
Attorney, Agent, or Firm—Raymond F. Kramer

[57] ABSTRACT

A turbine, such as a steam turbine, which may be employed to drive an electric generator, is operated by movement through it of gas vaporized in a heat pipe. The turbine is enclosed in the heat pipe structure and the pipe is sealed so that the vaporizable fluid therein is not lost during use. The fluid is maintained at a desired pressure at which it is readily vaporized by heating means, such as heated air brought into contact with the heat pipe, and is also readily condensed by cooling means, such as ambient air. In modifications of the more basic invention an auxiliary heat pipe or a plurality of such pipes is employed to extract energy from a source of heat after it has heated the turbine-containing heat pipe and such auxiliary heat pipe(s) may also be used to pre-heat a heat transfer fluid. Turbines may be present in the auxiliary heat pipes too and they may be connected to the same or different generators. The generators may be enclosed in an insulating medium common to the heat pipe to prevent external heat losses and in a further modification of the invention, may be mounted inside the heat pipe with the turbine. Although the invention is primarily intended for efficient power production it may be adapted for use as an indicator of temperature differences by utilizing the flow of evaporated fluid, which is proportional to the temperature difference, to generate electricity, the voltage or current flow of which may be measured.

15 Claims, 6 Drawing Figures

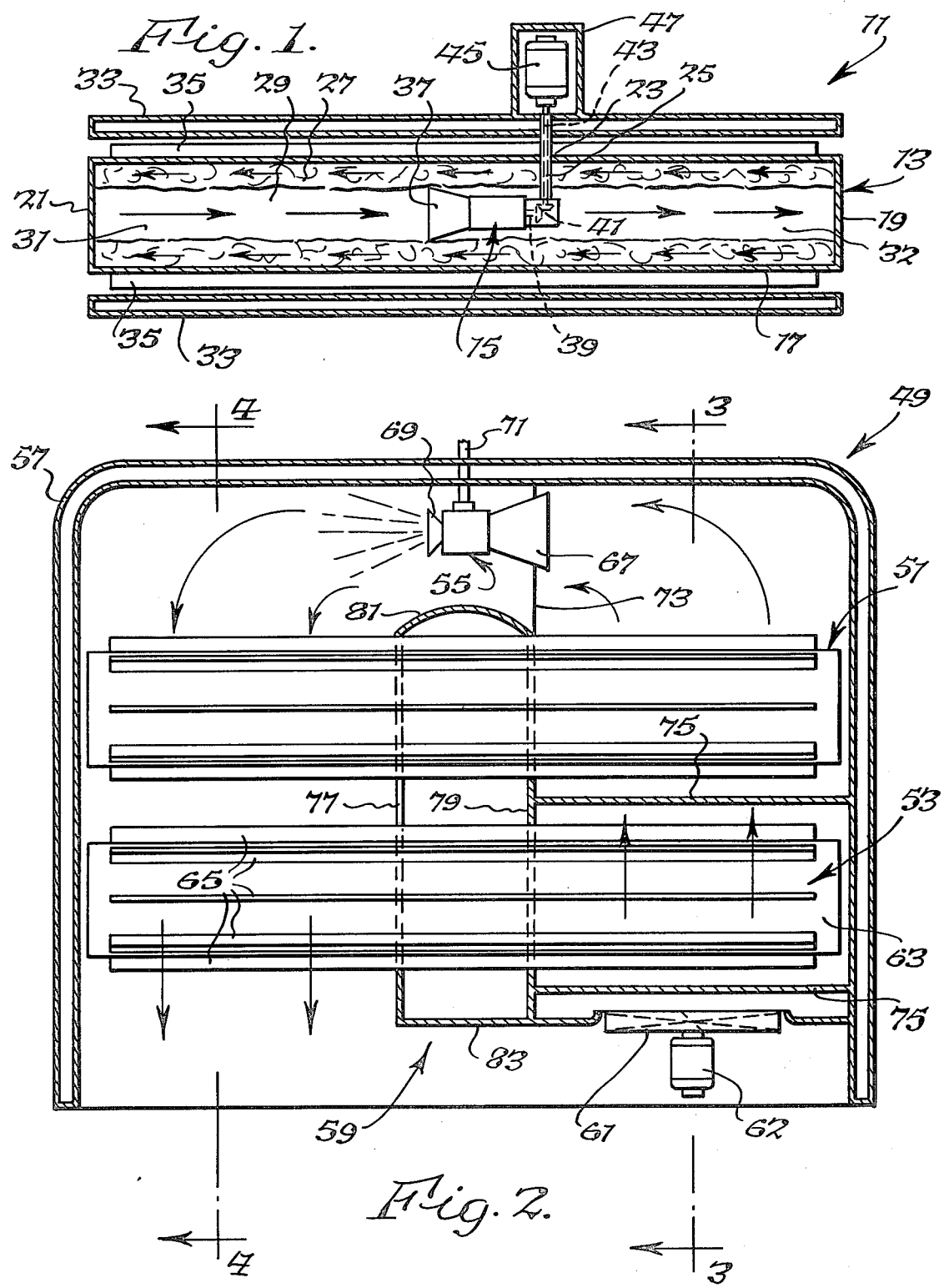

HEAT PIPE-TURBINE

This invention relates to the production of power by a unique combination of a means for producing gas flow and a turbine. The invention is of heat pipe-turbine, wherein a gas turbine is located in the path of gas flow in the heat pipe. More particularly, in such an apparatus the turbine, which may be associated with an electric generator, is positioned between evaporating and condensing sections of the heat pipe and is continuously operated to provide power when the evaporating end of the heat pipe is heated and the condensing end is cooled, usually by hot and cold gases, respectively. The invention also includes the use of an auxiliary heat pipe or a plurality of such pipes, to recover heat from a heating gas employed to heat the evaporating end of the heat pipe of the heat pipe-turbine, and to pre-heat combustion air being charged to combustion means for producing such hot gas.

The conversion of thermal energy to mechanical and electrical energy by means of combinations of burners, boilers, condensers, gas turbines and generators is well known and accordingly, requires little discussion. Usually, in such apparatuses, a fossil fuel, such as coal, oil or gas, or manufactured gas is burned in air and the hot combustion gas produced is employed to heat water and produce steam, which passes through a turbine wherein some of the thermal energy thereof us transformed into mechanical energy, and is condensed, with the condensate being returned to the boiler. Normally, water is employed to cool the condenser and pumps are needed to pump the cooling water and to transfer the condensate to the boiler and force it into the boiler against the pressure therein. Waste heat from the combustion gases, after they have been employed to heat the boiler water and generate steam, may be recovered by using such spent gases to pre-heat condensate being returned to the boiler but usually heat transferred to the cooling water by the steam, as it condenses, is not efficiently recoverable.

It has been considered desirable to improve the operating conditions of the conventional steam boiler-turbine combination and to increase its efficiency or to replace it with a more efficient system or apparatus for transforming thermal energy into other useful energy forms. Thus, lowering heat losses from the condensing steam to the cooling water, increasing efficiency of heat transfer from combustion gas to water being evaporated in the boiler and decreasing heat losses from the system due to radiation, convection and conduction are obviously desirable. By means of the present invention such increased efficiencies of operations and consequent energy savings are obtainable and the size of the installation may be reduced, too.

In accordance with the present invention the heat pipe-turbine comprises a heat pipe having evaporating and condensing sections, means for heating the evaporating section, means for cooling the condensing section, a vaporizable liquid in the pipe, return means for returning condensate from the condensing section to the evaporating section and a turbine inside the heat pipe so located that fluid evaporated in the evaporating section of the heat pipe passes through the turbine as a gas and drives it, after which said gas is condensed to a liquid in the condensing section and is returned to the evaporating section as a liquid through the return means. In preferred embodiments of the invention the vaporizable liquid in the heat pipe is water, the means for heating and cooling the evaporating and condensing sections of the pipe respectively are hot air (combustion gases) and cold air, the heat pipe is a finned pipe containing circumferential or peripheral wicking means to return the condensate to the evaporating section and a central path for flow of gas (steam) in the opposite direction and a turbine is contained in the heat pipe in the path of gas flow, to be driven by said gas flow. In other preferred embodiments of the invention auxiliary heat pipes are utilized to recover waste heat from the combustion gases after such gases have been used to heat the evaporating end of the heat pipeturbine, and to pre-heat at least a portion of the gas to be employed to burn the fuel for the production of the hot combustion gases. Also in a preferred form of the invention an electric generator is operatively connected to the turbine and is enclosed in the heat pipe.

The invention will be readily understood from the description thereof herein, taken in conjunction with the drawing in which:

FIG. 1 is a central sectional elevational view of the heat pipe-turbine of this invention with the turbine driving an electric generator;

FIG. 2 is a partially sectioned view along plane 2—2 of FIG. 3 of a heat pipe-turbine assembly comprising a heat pipe-turbine, such as that illustrated in FIG. 1, a burner for producing hot gas, an auxiliary heat pipe for recovering waste heat and for pre-heating gas being sent to the burner, and fan or blower means for directing the cooling gas over the condensing sections of the heat pipes and subsequently, after heating, over the evaporating sections;

Figure 6:
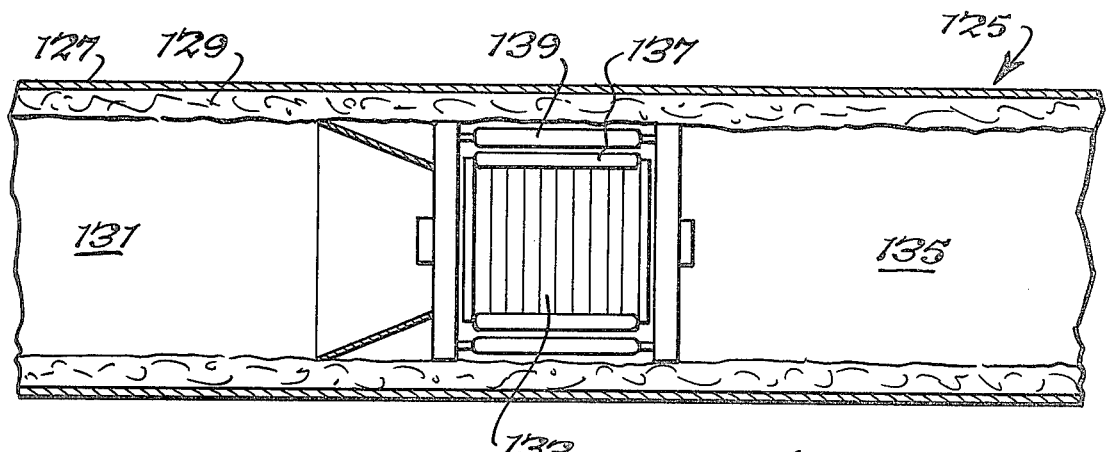
Figure 5:
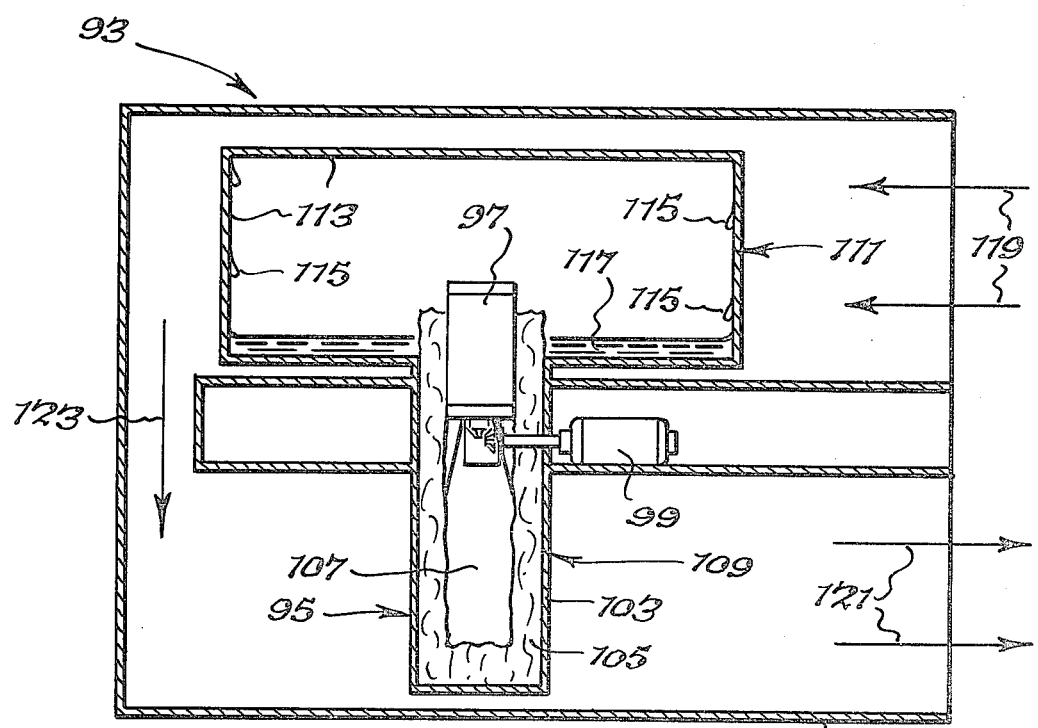

FIG. 5 is a vertical sectional elevational view of a vertical heat pipe-turbine embodiment of the invention, showing the use of an enlarged evaporating chamber section of the heat pipe, the walls of which are bare of wicking or capillary material; and FIG. 6 is a partially sectioned central sectional elevational view of part of a heat pipe-turbine of this invention wherein the turbine drives a generator enclosed within the heat pipe.

In FIG. 1 heat pipe-turbine 11 includes heat pipe 13 and turbine 15. Heat pipe 13 has a conductive wall 17 and is sealed at at least partially conductive ends 19 and 21 and at 23 wherein bearing sleeve 25 passes through wall 17. Along the interior of heat pipe 13, about the circumference or periphery thereof, is wicking or capillary material 27 and between the interior surfaces of such material is an open volume 29 which, during operation of the heat pipe, is filled with moving gas. The heat pipe interior includes an evaporating section 31, largely or completely upstream of the turbine, and a condensing section 32, largely or completely downstream thereof. In these, heat transmitted through walls 17 and 21 heats wicking 27 and any vaporizable liquid, such as water, present thereon to convert it to a hot gas, such as steam, which then moves through turbine 15 to condensing section 32, a cooler section, wherein heat extracted from the gas through wicking 27 and walls 17 and 19 by passage of cooling means (cooling air) into contact with walls 17 and 19 causes condensation of the gas to a liquid, which liquid is returned to the evaporating section via wicking 27. The vaporization, condensation and return of the vaporizable liquid for repetition of the cycle takes place very rapidly, almost instantaneously in many cases, with only smll temperature differentials being sufficient for satisfactory operation. Similarly, the apparatus is operative at relatively small pressure differentials, too. Heating means, such as hot gas, may be passed into contact with the conductive external walls of the evaporating section of the heat pipe by passage between such walls and insulating sleeve or cover 33 (often of vacuum type), either longitudinally or transversely but preferably will be passed transversely. Similarly, cooling means may be employed to condense the gas in the condensing section of the heat pipe. Longitudinal fins 35 are present on the conductive wall of the heat pipe to facilitate heat transfer from such external heating or cooling means to the pipe interior.

Turbine 15 includes a cone-shaped inlet section 37 which is in substantial contact with the interior surface of wicking 27 so as to direct substantially all of the moving gas passing from the evaporating section to the condensing section through the turbine. The rotation of turbine shaft 39 is transmitted via conventional bevel gearing 41 to shaft 43 and external electric generator 45, which may be contained in a vacuum insulated housing 47. Controls for regulating the generator output by changing the temperature of the heating and/or cooling gases or other temperature regulating means may be employed but because they are of conventional design it is not considered necessary or desirable to illustrate them in FIG. 1. Such controls may operate to decrease the turbine speed by lowering the temperature of the heating gas and thereby may diminish the electric generator output, either in voltage or amperage or both and conversely, such generation of electricity can be increased by raising the temperature. Similarly, further lowering the temperature of the condensing section will tend to increase gas flow and turbine speed and consequently will increase generation of electricity whereas the opposite effect will be obtained by raising the temperature of the cooling gas. As illustrated, the heat pipe-turbine-generator combination is positioned horizontally but it is also operative when mounted vertically or at an angle between the vertical and horizontal but it may be preferred for the evaporating section to be below the condensing section so that gravity may assist the return of condensate to the evaporating section. When desired, to assist in returning the condensate to the evaporating section of the heat pipe-turbine unit or the auxiliary heat pipes, piping and pumping means may be installed in the heat pipe, together with appropriate controls but it is not considered to be necessary to illustrate such features in the drawing. Although it is not illustrated in FIG. 1 it is preferred that the heating means and the cooling means, usually hot and cold gases respectively, be kept separate from each other and therefore baffle means may be employed between such sections, usually being located downstream of the turbine, to keep the mentioned gases apart, for greatest efficiency of operation. Of course, the entire unit of FIG. 1 may be enclosed within a housing with appropriate inlet and outlet ports for gas flow. Such housing will preferably be well insulated, as by vacuum enclosing walls, to prevent undesirable heat losses and diminutions of efficiency of operation. Instead of hot or cold gases various means capable of heating the evaporating section and cooling the condensing section may also be employed, either for complete or partial effects, such as resistance heating coils, refrigeration, lenses and reflectors concentrating solar heat, chemical reactions, geothermal heat and waste heat from industrial process streams.

In FIG. 2 heat pipe-turbine assembly 49 includes a heat pipe-turbine 51, essentially like that of FIG. 1, an auxiliary heat pipe 53, a burner 55, an insulated (vacuum) housing 57, baffle means 59 and blower or fan 61, powered by motor or other drive means 62. The details of the heat pipe-turbine 51 have already been given in the description of such apparatus of FIG. 1 but, because of the enclosure of the heat pipe-turbine assembly of FIG. 2 by insulating means 57, insulating means 33 of FIG. 1 is not employed. For simplicity of illustration the internal turbine, shafting, gearing, wicking and flow details are not given but the direction of gas flow is from left to right and that of liquid flow is from right to left, as in FIG. 1. The auxiliary heat pipe 53 includes conductive pipe 63, fins 65 and internal wicking, not shown, but positioned the same as that in the heat pipe-turbine of FIG. 1. Burner 55 has an inlet cone 67 and an exhaust section 69 and fuel is directed into the combustion zone via line 71. Divider 73 prevents air for combustion from bypassing the burner and mixing with combustion gas, which would objectionably lower the temperature of the gas passing over the evaporating zones of the heat pipe-turbine and the auxiliary heat pipe. Baffle means 59 includes section 75 separating pre-heated air or other gas that has passed over the condensing section of the auxiliary heat pipe and cooling air (also being pre-heated) passing over the condensing section of the heat pipe-turbine. Baffle sections 77 and 79 prevent intermixing of heating and cooling gases, as do baffle end walls 81 and 83. If desired, the heat pipe outer walls may be insulated between the baffles and between the evaporating and condensing sections and the fins may be interrupted in such sections, to limit heat transfer between the evaporating and condensing section walls of the heat pipes.

Figure 3:
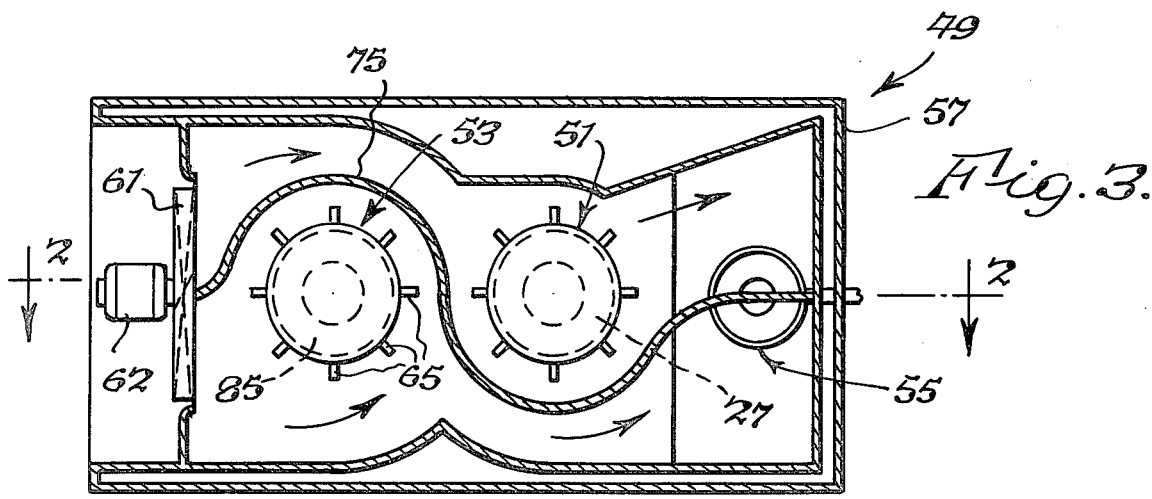
FIG. 3 is a vertical sectional elevational view along plane 3—3 of FIG. 2, illustrating the location of baffle means separating the condensing sections of the heat pipe-turbine and the auxiliary heat pipe.
Figure 4:
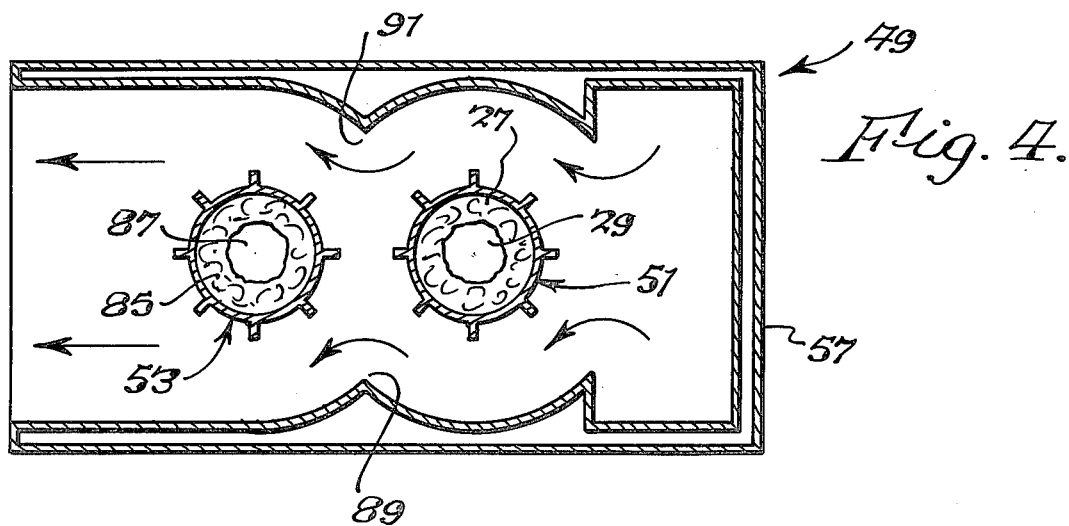
FIG. 4 is a vertical sectional elevational view along plane 4—4 of FIG. 2, illustrating the flow of hot gas sequentially over the heat pipe-turbine and the auxiliary heat pipe.

In FIG. 3 the separating of the cooling air portions by baffle 75 is illustrated more clearly, showing that while fan 61 blows cooling air into contact with both auxiliary heat pipe 53 and heat pipe-turbine 51, the air heated by the auxiliary heat pipe does not pass over the heat pipe-turbine. Thereby, the condensation of vaporizable liquid in the condensation section of such heat pipe-turbine is promoted. Wicking materials 27 and 85 line the mentioned heat pipes and define vapor spaces therein, designated by numerals 29 and 87, respectively. in FIG. 4 internal walls 89 and 91 are so shaped as to maintain about constant volumes of gas flow about the heat pipe-turbine and auxiliary heat pipe and into contacts with the fins and walls thereof.

In FIG. 5 heat pipe-turbine 93 includes heat pipe 95, turbine 97 and electric generator 99 in housing 101. Heat pipe 95 includes conductive wall 103, wicking 105 and internal vapor space 107 for the evaporation section 109, with the condensation section 111 including bare inner walls 113 on which condensate 115 forms and from which such condensate flows by gravity to form pool 117, which feeds wicking 105. Of course, turbine 97 drives electric generator 99. Arrows 119 show the direction of cooling gas flow into the assembly and arrows 121 show waste hot gas flow out after transfer of heat therefrom to the evaporating section of the heat pipe-turbine sub-assembly. Intermediate the two sections, as at arrow 123, such gas (usually air) is heated.

In FIG. 6 heat pipe 125, comprising an exterior wall 127 and wicking or capillary material 129 therein, has evaporation section 131 upstream of turbine 133 and condensation section 135 downstream thereof. Turbine 133 rotates about an axis which is parallel to the axis of pipe 125 and moves electric generator rotor 137 with it (it is mounted on the same shaft), cutting lines of force created by generator stator 139 and thereby generating electricity. Due to the enclosure of the turbine and generator within the heat pipe no heat losses occur from either of these components of the assembly and the generator is "cooled" by the gas passing over it.

Component parts of the present apparatuses may be those heat pipes, turbines, generators (AC or DC), fans, burners and other elements of the present structures which are known in the art, many of which are readily commercially available. For example, the heat pipes may include thin walled linear piping of conductive materials such as aluminum, copper, stainless steel, nickel plated steel, chromium plated steel or even silver, in some instances, but may also be of glass or suitable synthetic organic polymer, such as nylon, polypropylene, polymethyl methacrylate or such polymer having conductive metal flakes, e.g., aluminum flakes, or other particles dispersed therein. The pipes may be of various sizes, e.g., from as little as 1 cm. to 5 meters or more, and wall thicknesses will be from 0.1 mm. to 1 mm., usually being from 0.1 to 10% of the diameter. The wicking material in the pipe may be any suitable such material which has been employed for such purpose, among which may be mentioned asbestos fibers, threads and cords, sintered porous matrices, such as those of clays, glasses and ceramics, open glass meshes, fiberglasses and even ordinary organic fibrous and textile materials, such as those of cotton, nylon, polyethylene terephthalate and polyethylene terephthalate-cotton blends. Instead of wicking materials, capillary tubes may be employed and in some instances comparatively thin tubes may be filled with wicking elements and a plurality thereof may be used in place of conventional wicking or sorbent materials.

The heat pipes will usually be straight pipes of circular cross-sections but other cross-sectional shapes may be employed and the pipes may be curved, sinuous or of other suitable shape. The working fluid in the pipe is preferably water but various other normally liquid materials may be utilized, including: halogenated hydrocarbons, such as tetrafluoromethane, dichlorodifluoromethane, tetrafluorodichloroethane and octafluorocyclobutane; hydrocarbons, such as butane, pentane and benzene; lower alkanols, such as methanol, ethanol, isopropanol; ketones, such as acetone and methylethyl ketone; ethers, such as diethyl ether; carbon dioxide; and even liquid metals, such as mercury. As is known in the heat pipe art, the working fluid, a vaporizable liquid, will be chosen so that at the temperatures at the end sections of the heat pipe the fluid will pass from liquid to vapor phase and back again, depending on its position in the heat pipe and the heat transfer through the pipe. In some instances a non-condensable gas may also be present in the heat pipe and the pressure thereof may be controlled so as to obtain a desired temperature of vaporization and condensation of the heat pipe fluid. For example, air at atmospheric pressure may be inside the pipe or a vacuum may be drawn on the pipe, e.g., 500 mm. Hg, or the pipe may be maintained under pressure, e.g., 3 atmospheres. Normally, either atmospheric pressure or vacuum will be utilized so that the heat pipe will operate at a lower temperature, at which its efficiency will be increased.

In the drawing wherein a source of heat to the heat pipe is indicated FIGS. 2 and 3) it is shown as a burner for a fuel such as oil or gas but it is possible and often highly desirable to utilize instead, other sources of heat, such as solar heat, geothermal heat, waste industrial heat and the heat in materials to be cooled before discharge thereof, e.g., nuclear reactor cooling water. Utilizing such sources of heat, the apparatus of FIG. 2 may be completely enclosed so that there is no need to feed additional air for combustion purposes and to exhaust a corresponding amount of air. Thus, heat losses will be further diminished. In such cases the various sources of heat or heat exchange devices containing materials heated by such sources are located at the position indicated for the burner in FIG. 2 and insulating wall 57 is continued across the bottom of the unit. When temperatures of the sources of energy vary it is a simple matter to adjust the internal pressure of the heat pipe or to utilize a different heat pipe fluid so that the temperature transmitted to the evaporating end or section of the heat pipe is sufficient to vaporize the vaporizable liquid in the heat pipe-turbine and the temperature of the circulating gas (or liquid, which is moved through the system by a pump instead of a fan) is sufficiently low to cause condensation at the condensing section of the heat pipe-turbine. Incidentally, instead of gas or liquid being used to transfer heat to or from the heat pipe other means may also be employed, e.g., a metal conductor, hollow coils containing heat transfer fluid. Also "heating" and "cooling" operations may be at essentially the same temperature (of the heat pipe fluid). If desired, to effect most efficient heating and cooling, a large number of auxiliary heat pipes, e.g., as many as 10 to 20 thereof, are sometimes employed but preferably only one heat pipe-turbine unit will be utilized, together with from 1 to 5 auxiliary heat pipes. A baffle like that of FIG. 3, identified by numeral 75 therein, will preferably still be utilized so as to maintain the temperature at the condensing end of the heat pipe-turbine as low as feasible to promote most efficient condensation. To assist such condensation (and evaporation) additional finning may be utilized on the heat pipes and different fin designs may be employed, such as those running transversely about the peripheries of the pipes. Although it is desirable to utilize only one heat pipe-turbine unit, with one or a plurality of auxiliary heat pipes, in some embodiments of the invention a plurality of such heat pipe-turbines may be employed, e.g., 2–4, and in such cases a corresponding number of auxiliary heat pipes will often be utilized too.

In operation, referring specifically to the heat pipe-turbine of FIG. 1, the volatile heat pipe liquid is selected for the particular application and the non-condensable gas pressure, if any, in the heat pipe is adjusted so that at the prospective inlet temperature the liquid (it is usually a liquid at ambient air temperature, e.g., 10° to 35° C.) will be readily vaporized and will be readily condensed in the condensing section of the heat pipe. It is then only necessary to apply the source of heat to one end of the pipe and the source of coolant (in some instances it may be ambient air or other cooling air) to the condensing end. The flow of gas from one end of the heat pipe to the other will drive the turbine and the turbine will drive the generator and produce the desired electricity. In the event that mechanical power is wanted instead it may be taken off directly from the rotating turbine shaft that would otherwise drive the generator (or alternator). Of course, intead of a conventional turbine other gas driven rotary movement producing means may be employed, such as those of fan or "windmill" designs.

In operating the heat pipe-turbine assembly of FIG. 2, after choosing the desired heat pipe fluid and non-condensable gas pressure in the pipes, if any, the fan is started and the burner is ignited, causing flows of gas and liquid in the heat pipe and operation of the turbine and generator of the heat pipe-turbine-generator unit. To minimize heat losses in exiting gases the amount of gas allowed to exit (a similar amount is drawn into the system) is preferably limited so that only the desired amount of oxygen for combustion is provided to the burner. In some cases, oxygen may be added to the system and carbon dioxide and water, and any other combustion products except oxygen, nitrogen and argon, produced by hydrocarbon combustion, may be removed in known manner so that it will not be necessary to exhaust and add the diluent quantities of nitrogen and argon accompanying the oxygen in the air. Of course, when another source of energy than combustion is utilized or when the heat of combustion is indirectly transferred to the heat pipeturbine assembly, as through a heat exchanger, so that no oxygen is required for combustion in such assembly, the system may be closed and little or no material will enter of leave it. In such operation, efficiency of the unit is usually over 90% and often approaches 100%, especially if the insulation about it is of the very effective vacuum type, the vacuum normally being from 650 to 750 mm. Hg. Thus it is seen that even if only about 10% of the heat energy in the gas passing over the evaporating end of the heat pipe-turbine is extracted from it in a single pass, the other 90% is recycled to the heat pipe-turbine, with none being lost, making for an ultimate efficiency approaching 100%.

In those instances wherein the heat pipe-turbine assembly includes a plurality of heat pipe-turbines, each of which may be operatively connected to a generator, the various turbine speeds may be adjusted to be the same and the turbines may be employed together to operate a single generator or separate generators may be turned by the separate turbines. To adjust the speeds of the turbines one may change the non-condensable gas pressure, change the quantity of vaporizable fluid in the particular heat pipe-turbine, alter the available heat transfer area, as by shielding from the heat source some of the heat pipe surface or may take other such steps to increase or decrease gas flow in the various heat pipes. Also, by regulating the temperature applied to the different heat pipe evaporating ends pressure differentials on the turbines may be controlled (equalized) so as to run the turbines at the same speeds. It is considered that by means of the proper connections to the heat pipe interior and by means of a mechanism for operating a shielding means, not illustrated, some such changes may be readily effected. When a plurality of heat pipe-turbines is employed designs for the various baffles may be modified accordingly, so as to have the desired cooling power at the condensation ends of the heat pipe turbine units. Alternatively, in some cases, baffle 75 may be omitted if sufficient condensation is otherwise obtainable.

Operation of the embodiment of the invention illustrated in FIG. 5 is effected substantially the same way as previously described for the other heat pipe-turbines and heat pipe-turbine-generator combinations. However, the cooling air temperature may be higher because of the greater heat transfer area of the "condensing section" of the heat pipe. The embodiment of the invention illustrated in FIG. 6 may be adapted for inclusion in the units shown in FIGS. 1–5 and of course, the particular connection of the turbine to the generator may be varied. Sometimes the generator is also included within the heat pipe, so as to minimize the possible losses of materials or vacuum through shaft or other openings. In none of the drawings are any leads from the generator shown but it will be evident that these are installed in the usual manner and are brought out from the various systems described, normally through carefully sealed passageways.

The invention has been described with respect to various illustrations of preferred embodiments thereof but is not to be limited to these because it is evident that substitutes and equivalents for various components thereof may be utilized and various modifications may be made therein without departing from the spirit of the invention. An example of such a modification is application of the heat pipe-turbine described to function as a temperature difference meter, with the voltage or amperage output of the generator indicating the magnitude of the temperature difference to which the heat pipe ends are subjected.

What is claimed is:

1. A heat pipe-turbine assembly which comprises: a heat pipe-turbine, which includes a heat pipe having evaporating and condensing sections, means for heating the evaporating section, means for cooling the condensing section, a vaporizable liquid in the pipe, return means for returning condensate from the condensing section to the evaporating section and a turbine inside the heat pipe so located that fluid evaporated in the evaporating section of the heat pipe passes through the turbine as a gas and drives it, after which said gas is condensed to a liquid in the condensing section and is returned to the evaporating section as a liquid through the return means; and an auxiliary heat pipe so positioned as to extract heat from the means for heating the evaporating section of the heat pipe-turbine after said heating of the evaporating section is effected and to transfer said heat to means for heating the evaporating section to increase the heat content thereof before said evaporating section is heated.

2. A heat pipe-turbine assembly according to claim 1 wherein the means for heating the evaporating section of the heat pipe-turbine is a hot gas which contacts the evaporating section of the heat pipe thereof and the means for cooling the condensing section of the heat pipe-turbine is a cooling gas which contacts the condensing section of the heat pipe thereof, which includes combustion means for burning fuel to produce the hot gas and wherein the auxiliary heat pipe transmits waste heat in the hot gas after it passes the heat pipe-turbine to pre-heat gas being fed to the combustion means.

3. A heat pipe-turbine assembly according to claim 2 comprising a separating buffle to prevent gas pre-heated by the auxiliary heat pipe from contacting the condensing portion of the heat pipe-turbine and in which the condensing portion of the heat pipe-turbine includes a passageway for non-pre-heated cooling air to be passed over it and to the combustion means together with gas pre-heated by the auxiliary heat pipe.

4. A heat pipe-turbine assembly according to claim 3 wherein fan means are provided to force cooling air separately over the surfaces of the condensing sections of both the heat pipe-turbine and the auxiliary heat pipe.

5. A heat pipe-turbine according to claim 1 in which heat extracted from the gases in the condensing sections of the heat pipe-turbine and the auxiliary heat pipe is at least partially recovered and is returned to the evaporating section to assist in evaporating the vaporizable liquid in the heat pipe at such section.

6. A heat pipe-turbine assembly according to claim 1 wherein the vaporizable liquid in the heat pipe is one which vaporizes and condenses at a pressure less than atmospheric when the temperature thereof is about that of ambient air and the pressure in the heat pipe is maintained less than atmospheric.

7. A heat pipe-turbine assembly according to claim 2 wherein the heat- pipe-turbine is a finned pipe, the vaporizable liquid is one which is a liquid at normal ambient temperature at the pressure in the condensing section of the heat pipe and the return means are capillary means, and which comprises an electric generator operatively connected to the turbine.

8. A heat pipe-turbine assembly according to claim 7 wherein the heat pipe and the fins thereon are of heat conductive material, the heat pipe is a straight tube and the fins thereof run parallel to the pipe axis, the capillary return means are located in the heat pipe adjacent the walls thereof, the vaporizable liquid is water and the turbine includes an inlet section of cross-sectional area essentially the same as that of the cross-sectional area inside the capillary material for passage of gas through the heat pipe, so as effectively utilize all the gas produced by evaporation of the liquid for turning the turbine.

9. A heat pipe-turbine according to claim 1 which is vacuum insulated from its surroundings.

10. A heat pipe-turbine which comprises a heat pipe having evaporating and condensing sections, the condensing section being of effective heat transfer surface area greater than that of the evaporating section, being located above the evaporating section and including walls bare of capillary return means and suitable for returning condensate from the condensing section toward the evaporating section by gravity, means for heating the evaporating section, means for cooling the condensing section, a vaporizable liquid in the pipe, capillary return means for returning condensate from the condensing section and through at least part of such section, to the evaporating section and a turbine inside the heat pipe so located that fluid evaporated in the evaporating section of the heat pipe passes through the turbine as a gas and drives it, after which said gas is condensed to a liquid in the condensing section and is returned to the evaporating section as a liquid through the return means.

11. A heat pipe-turbine which comprises a heat pipe having evaporating and condensing sections, means for heating the evaporating section, means for cooling the condensing section, a vaporizable liquid in the pipe, return means for returning condensate from the condensing section to the evaporating section, a turbine inside the heat pipe so located that fluid evaporated in the evaporating section of the heat pipe passes through the turbine as a gas and drives it, after which said gas is condensed to a liquid in the condensing section and is returned to the evaporating section as a liquid through the return means, and means for recovering at least part of the heat extracted from the gas condensed in the condensing section, and returning it to the evaporating section to assist in evaporating the vaporizable liquid in the heat pipe at such section.

12. A heat pipe-turbine which comprises a heat pipe having evaporating and condensing sections, means for heating the evaporating section, fluid means for cooling the condensing section, said fluid means extracting heat from said condensing section after which said fluid means is heated to raise its temperature and is employed to heat the evaporating section of the heat pipe, whereby the heat removed from the condensing section is conserved, a vaporizable liquid in the pipe, capillary means for returning condensate from the condensing section to the evaporating section and a turbine inside the pipe so located that fluid evaporated in the evaporating section of the heat pipe passes through the turbine as a gas and drives it, after which said gas is condensed to a liquid in the condensing section and is returned to the evaporating section as a liquid through the return means.

13. A heat pipe-turbine which comprises a finned tubular heat pipe of heat conductive material, having evaporating and condensing sections, means for conducting a heating gas to the evaporating section to heat it, means for conducting a cooling gas to the condensing section to cool it, a vaporizable liquid in the heat pipe, capillary return means in the heat pipe adjacent the wall thereof for returning condensate from the condensing section to the evaporating section by capillary action, a turbine inside the heat pipe so located that gas from liquid evaporated in the evaporating section of the heat pipe passes through the turbine and drives it, after which said gas is condensed to a liquid in the condensing section and is returned to the evaporating section as a liquid through the capillary return means, said turbine including an inlet section at an end thereof which is frustoconical in shape with the larger end thereof being located upstream and being of a cross-sectional area, taken transversely with respect to the heat pipe, essentially the same as such cross-sectional area of the heat pipe inside the capillary material, also taken transversely with respect to such pipe, so as effectively to utilize for turning the turbine all the gas produced by evaporation of the liquid in the evaporating section of the heat pipe.

14. A heat pipe-turbine according to claim 13 which includes an electric generator inside the heat pipe and operatively connected to the turbine.

15. A heat pipe-turbine which comprises a finned tubular heat pipe of heat conductive material, having evaporating and condensing sections, means for conducting a heating gas to the evaporating section to heat it, means for conducting a cooling gas to the condensing section to cool it, a vaporizable liquid in the heat pipe, capillary return means in the heat pipe adjacent the wall thereof for returning condensate from the condensing section to the evaporating section by capillary action, a turbine inside the heat pipe so located that gas from liquid evaporated in the evaporating section of the heat pipe passes through the turbine and drives it, after which said gas is condensed to a liquid in the condensing section and is returned to the evaporating section as a liquid through the capillary return means, said turbine including an inlet section at an end thereof which is frustoconical in shape with the larger end thereof being located upstream and being of a cross-sectional area, taken transversely with respect to the heat pipe, essentially the same as such cross-sectional area of the heat pipe inside the capillary material, also taken transversely with respect to such pipe, so as effectively to utilize for turning the turbine all the gas produced by evaporation of the liquid in the evaporating section of the heat pipe, and said heat pipe-turbine being vacuum insulated from its surroundings.

* * * * *